United States Patent
Bauer

(10) Patent No.: US 7,021,501 B2
(45) Date of Patent: Apr. 4, 2006

(54) FAUCET LEVER LOCK

(75) Inventor: Ron Bauer, Racine, WI (US)

(73) Assignee: Emerson Electric Co., St. Louis, MO (US)

( * ) Notice: Subject to any disclaimer, the term of this patent is extended or adjusted under 35 U.S.C. 154(b) by 27 days.

(21) Appl. No.: 10/605,533

(22) Filed: Oct. 6, 2003

(65) Prior Publication Data

US 2005/0072791 A1 Apr. 7, 2005

(51) Int. Cl.
*B67D 5/33* (2006.01)
(52) U.S. Cl. .................... 222/153.13; 251/90; 251/107
(58) Field of Classification Search ........... 222/153.13, 222/107, 153.14; 251/90, 89–116
See application file for complete search history.

(56) References Cited

U.S. PATENT DOCUMENTS

| | | | | |
|---|---|---|---|---|
| 3,927,834 A | * | 12/1975 | Tada | 239/359 |
| 4,252,160 A | * | 2/1981 | Numbers | 141/98 |
| 5,487,493 A | * | 1/1996 | McNabb | 222/153.14 |
| 5,590,682 A | * | 1/1997 | Fischer | 137/382 |
| 5,971,354 A | * | 10/1999 | Ecklund | 251/104 |
| 6,286,724 B1 | | 9/2001 | Midden | |
| 6,371,155 B1 | * | 4/2002 | Balocca | 137/377 |
| 6,648,178 B1 | * | 11/2003 | Grunewald | 222/153.02 |
| 2003/0164463 A1 | * | 9/2003 | Dou | 251/96 |

* cited by examiner

*Primary Examiner*—Michael Mar
*Assistant Examiner*—Sonia N. Khaira
(74) *Attorney, Agent, or Firm*—Locke Liddell & Sapp LLP

(57) ABSTRACT

A lock for a liquid dispensing faucet lever includes a locking member that is attachable to the faucet and can be positioned in a locked position where the lever seats in a notch formed therein to prevent moving the lever from the closed position to the open position. The locking member may be attached to the faucet via an opening extending therethrough for receiving the faucet's spout, such that the locking member is rotatable about the spout. The locking member is rotatable from the locked position to an unlocked position in which the lever is not seated in the notch, allowing movement of the lever from the closed position to the open position. The locking member may be configured such that it automatically moves from the unlocked to the locked position upon movement of the lever from the open to the closed position.

19 Claims, 2 Drawing Sheets

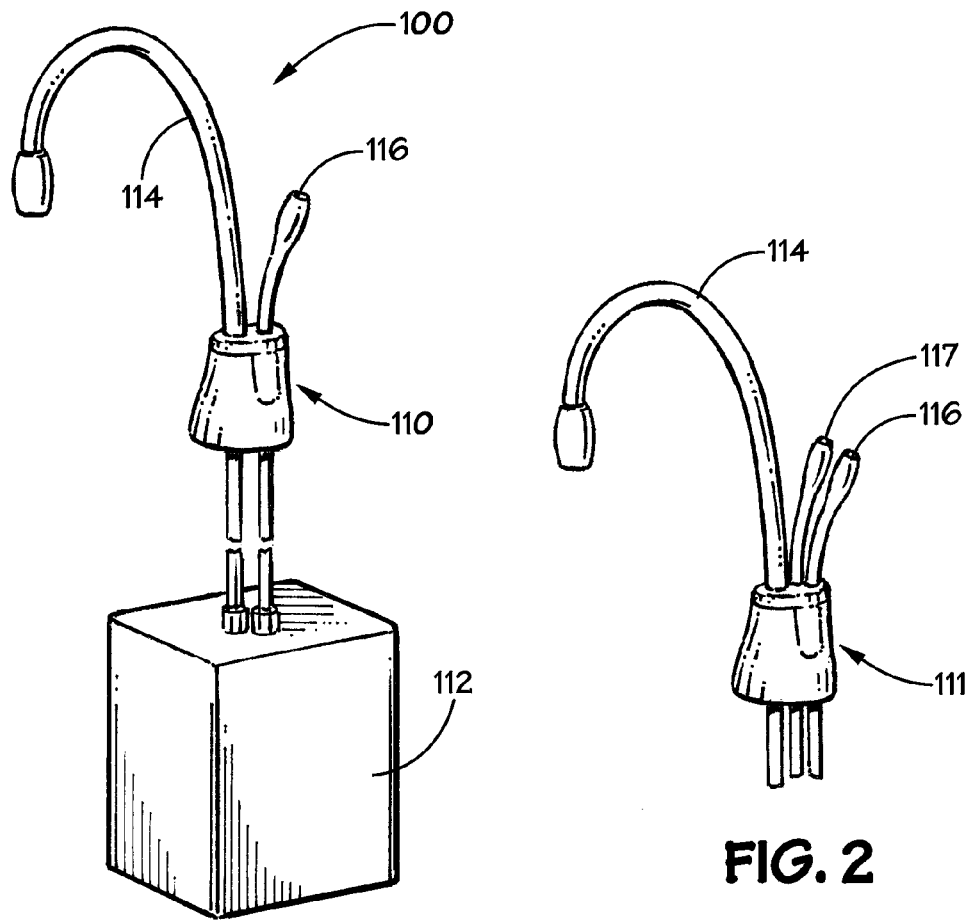
FIG. 1
FIG. 2
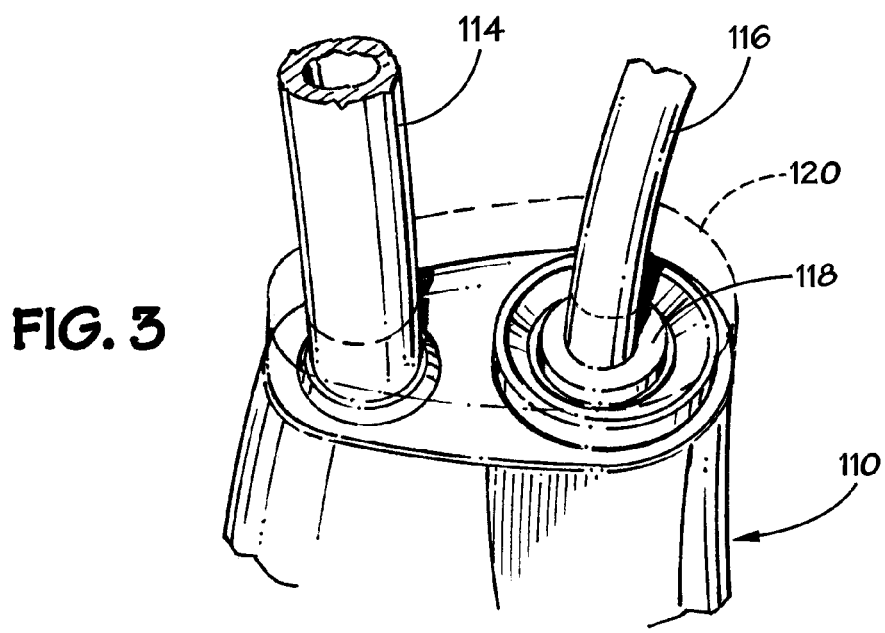
FIG. 3

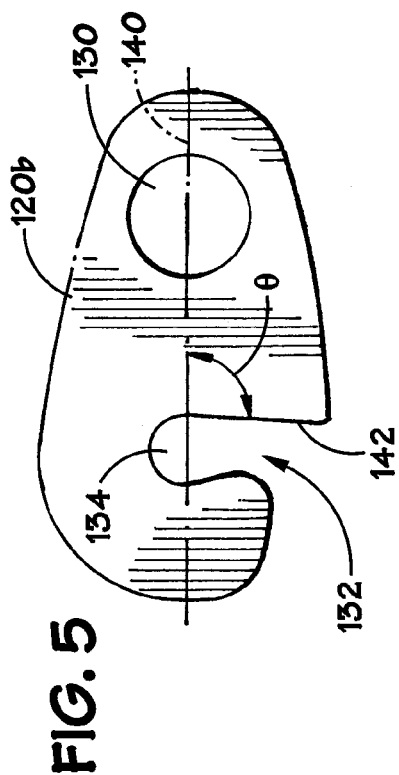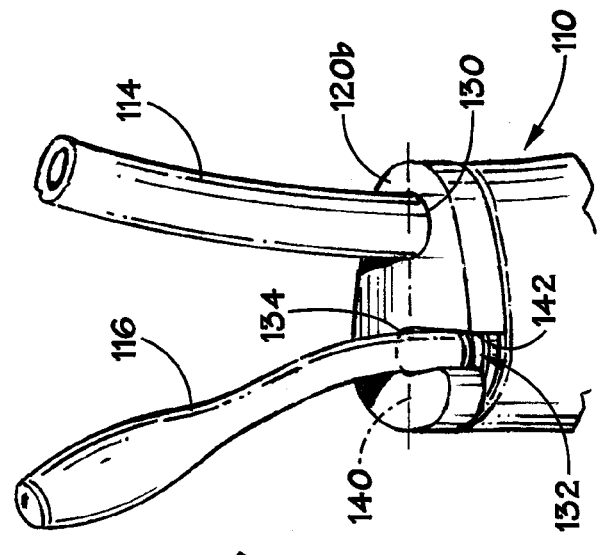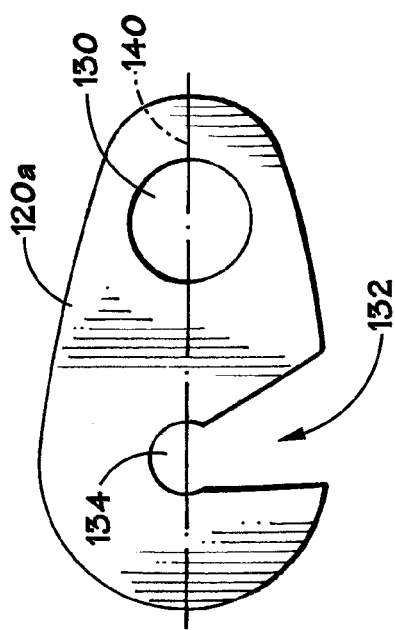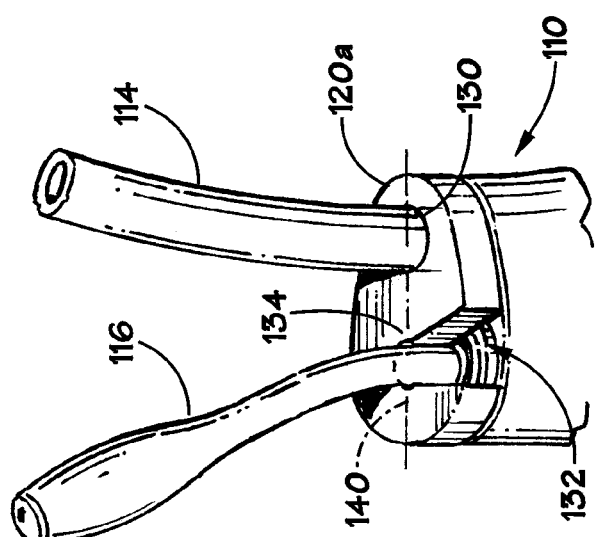
FIG. 4
FIG. 5
FIG. 6
FIG. 7

FAUCET LEVER LOCK

BACKGROUND OF DISCLOSURE

1. Field of the Disclosure

The present invention relates generally to liquid dispensers, and more particularly to a lever lock for such dispensers.

2. Description of Related Art

Liquid dispensers that mount to sinks are common. For example, such dispensers may be used to dispense filtered drinking water or instant hot water. Typically, these dispensers consist of two main parts, a faucet that would be situated above a sink for dispensing the liquid as desired, and another unit for mounting below the sink so it is out of view of the user and does not occupy counter space. For example, in a drinking water system the under-sink unit would include a filter or other water treatment unit connected to the faucet. For an instant hot water dispenser, the under-sink unit would have a water heater and a tank for holding hot water connected to the faucet.

As noted above, the faucet is usually mounted above the sink such that a user can dispense the amount liquid desired, while excess liquid falls into the sink. Such dispensers are typically used by opening a valve on the faucet to dispense the filtered water or hot water stored in the tank to the user. Several different methods may be used to open the valve such as twisting a handle, depressing a lever, or pushing a button on the faucet.

It may be desirable to lock the faucet in the closed position, thus preventing unwanted or unauthorized use of the dispenser. For example, with an instant hot water dispenser, it may be desirable to lock the faucet in a closed position to prevent accidental release of the hot water. Locking devices, however, may be costly. Further, retrofitting existing faucets to include a locking device may be too complicated for the typical consumer.

The present application addresses shortcomings associated with the prior art.

SUMMARY OF DISCLOSURE

A liquid dispensing system includes a valve having an inlet for receiving liquid and an outlet. A spout is in fluid communication with an outlet of the valve to dispense fluid therefrom. A lever is connected to the actuator to open and close the valve to dispense liquid as desired. A locking member is positionable in a locked position where the lever seats in a notch formed in the locking member to prevent moving the lever from the closed position to the open position. The locking member is movable from the locked position to an unlocked position in which the lever is not seated in the notch, allowing movement of the lever from the closed position to the open position. An exemplary locking member defines an opening therethrough, such as a cylindrical bore to receive a tubular spout. The spout opening receives the spout such that the locking member is rotatable about the spout so that it may be rotated between the locked and unlocked positions.

The notch may be shaped such that movement of the lever from the open position towards the closed position causes the locking member to automatically move to the locked position. Further, the valve may be a normally closed valve, wherein the lever automatically moves from the open position to the closed position upon releasing the lever. Thus, simply releasing the lever after opening the faucet causes the lever to move back to the closed position and automatically move the locking member to the locked position.

BRIEF DESCRIPTION OF DRAWINGS

Other objects and advantages of the invention will become apparent upon reading the following detailed description and upon reference to the drawings in which:

FIG. 1 is a perspective view generally illustrating components of a single-lever liquid dispensing system.

FIG. 2 is a perspective view generally illustrating components of a double-lever liquid dispensing system.

FIG. 3 illustrates portions of a faucet in accordance with aspects of the present invention.

FIG. 4 illustrates a locking member in accordance with an embodiment of the invention.

FIG. 5 illustrates a locking member in accordance with another embodiment of the invention.

FIG. 6 is a perspective view of the locking device shown in FIG. 4 shown in the locked position.

FIG. 7 is a perspective view of the locking device shown in FIG. 5 shown in the locked position.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers" specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIGS. 1–3 generally illustrate components of a typical water dispensing system 100. The dispensing system 100 includes a faucet 110 that would be situated above a sink for dispensing the liquid as desired, and an under-sink unit 112 for mounting below the sink so it is out of view of the user and does not occupy counter space. If the system 100 is employed for dispensing drinking water, for example, the under-sink unit 112 would include a filter or other water treatment unit connected to the faucet 110. For an instant hot water dispenser, the under-sink unit 112 would have a water heater and a tank for holding hot water connected to the faucet 110.

The faucet 110 of the illustrated dispenser includes an arched spout 114 to allow ample access to the dispenser, and a dispenser lever 116 that is actuated to dispense liquid as desired. In some units, additional dispenser levers may be provided for dispensing different liquids via the spout 114. Such a faucet is illustrated in FIG. 2, where the faucet 111 includes two levers 116, 117. For example, one lever 116 could dispense filtered drinking water, while the other lever 117 could dispense instant hot water.

The faucet 110 includes a valve 118 that has an inlet for receiving liquid from the under-sink unit 112 and an outlet connected to the spout 114. The lever 116 is connected to the valve actuator such that moving the lever 116 opens the valve 118 to dispense liquid through the spout 114. In the illustrated embodiments, the lever 116 has a closed position in which the distal end of the lever 116 is positioned closer to the spout than when the lever 116 is in an open position where the valve is open to allow liquid to be dispensed from the spout 114. In certain embodiments, the lever 116 is pivoted between the closed and open positions; for example, to rotate the actuator when a ball valve is used.

In accordance with aspects of the present invention, the dispensing system 100 further includes a locking member 120 that locks the lever 116 in the closed position. In the illustrated exemplary faucet 110, the lever 116 is locked in its normally closed position adjacent the spout 114, preventing moving the lever 116 to its open position farther from the spout 114. The locking member 120 is movable from the locked position to an unlocked position in which the lever 116 can be moved to its open position.

FIG. 4 and FIG. 5 show two exemplary locking members 120a, 120b in accordance with embodiments of the present invention. The locking member 120a, 120b is movable between its locked and unlocked positions. In the illustrated embodiments, it may be rotated from one position to the other. The locking member 120a, 120b defines a spout opening 130 therethrough, which receives the spout 114 so that the locking member is rotatable about the spout 114. The illustrated spout openings 114 are generally cylindrical bores extending through the locking member 120a, 120b to receive the tube-shaped spout 114. The locking member 120a, 120b is slid over the spout 114 to allow simple retrofit of existing faucets. In other embodiments, the locking member 120a, 120b may be rotatably connected to the faucet 110 by means other than the spout opening 130 receiving the spout 114. For instance, if a non-cylindrical spout is used, a separate cylindrical member extending from the faucet base may be provided to mate with the opening 130.

The locking member 120a, 120b further defines a notch 132 therein for locking the lever 116 in the closed position closer to the spout 114. The opening 130 and the notch 132 are generally situated at opposite ends of the locking member 120a, 120b. The locking member 120a, 120b can be positioned in the locked position in which the lever 116 seats in the notch, thus preventing movement of the lever from the closed position to the open position as illustrated in FIG. 6 and FIG. 7. To unlock the lever 116, the locking member 120a, 120b is rotated such that the lever 116 is no longer seated in the notch 132, allowing movement of the lever 116 from the closed position to the open position to dispense liquid as desired. As the lever 116 is also generally tubular, the notch 132 in the illustrated embodiments includes a radiused portion 134 that receives the lever 116 when in the locked position. Further, in the illustrated embodiments, the radiused portion 134 and the spout opening 130 are both centered on a longitudinal axis 140 of the locking member 120a, 120b, centering the locking member 120a, 120b on the base of the faucet 112.

In faucet configurations having two handles as shown in FIG. 2, the notch 132 typically would engage one of the levers 116 or 117. For example, if lever 116 releases instant hot water upon activation and lever 117 releases cold drinking water, the locking member 120a, 120b would likely be situated such that the "hot water" lever 116 seats in the notch 132 when in the closed position.

Additionally, the locking member 120b provides an automatic locking feature. The notch 132 of the locking member 120b is shaped such that movement of the lever 116 from the open position towards the closed position closer to the spout 114 (as illustrated in FIG. 7) causes the locking member 120b to move to the locked position. In the exemplary locking member 120b, this automatic locking feature is achieved via a stop portion 142 of the notch 132, which extends from the radiused portion 134 to an outer edge of the locking member 120b. When the lever 116 is moved from the open to the closed position, the stop portion 142 engages the lever 116, and the locking member 120b slides along the stop surface 142 as the lever 116 moves towards the spout 114 until it seats in the radiused portion 134 when the lever 116 reaches the closed position. The shape of the notch 132 facilitates the movement of the locking member 120b caused by the moving lever 116. As shown in FIG. 5, the stop portion 142 of the notch 132 defines an angle θ with the longitudinal axis 140. The angle θ is an obtuse angle when determined relative to the side of the locking member 120b where the spout opening 130 is located.

Often, such dispensing faucets are normally closed, so when released, the spring loaded valve actuator causes the lever 116 to automatically return to the closed position after being opened. Thus, to operate the faucet 110, a user simply rotates the locking member 120b from the locked position as shown in FIG. 7 to unseat the lever 116 from the notch 132. The user may then move the lever 116 in a direction away from the spout 114 to the open position to dispense liquid from the spout 114. Once the desired amount of liquid has been dispensed, the lever 116 is simply released and it moves back towards the closed position. The lever 116 engages the stop surface 142 to automatically move the locking member 120b back to the locked position.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A liquid dispensing system, comprising:
   a valve having an inlet for receiving liquid, an outlet and an actuator;
   a spout in fluid communication with the valve outlet;
   a lever connected to the actuator, the lever having a closed position in which the valve is closed, and an open position in which the valve is open to allow liquid to be dispensed from the spout;
   a locking member defining a spout opening therethrough, the spout opening receiving the spout such that the locking member is rotatable about the spout;
   the locking member defining a notch therein, the locking member being rotatable to a locked position in which the lever seats in the notch to prevent moving the lever from the closed position to the open position; and
   the locking member being rotatable from the locked position to an unlocked position in which the lever is not seated in the notch, allowing movement of the lever from the closed position to the open position.

2. The liquid dispensing system of claim 1, wherein the locking member defines a longitudinal axis, and wherein the spout opening is generally centered on the longitudinal axis.

3. The liquid dispensing system of claim 1, wherein the locking member defines a longitudinal axis, and wherein the spout and the lever are both generally centered on the longitudinal axis when the locking member is in the locked position.

4. The liquid dispensing system of claim 1, wherein the notch is shaped such that movement of the lever from the open position towards the closed position causes the locking member to move to the locked position.

5. The liquid dispensing system of claim 4, wherein the valve actuator is normally closed.

6. The liquid dispensing system of claim 5, wherein the actuator is spring loaded such that the lever automatically moves from the open position to the closed position upon releasing the lever.

7. The liquid dispensing system of claim 4, wherein the notch includes a radiused portion generally centered on a longitudinal axis of the locking member, the lever seating in the radiused portion when the locking member is in the locked position.

8. The liquid dispensing system of claim 4, wherein the notch includes a radiused portion generally centered on a longitudinal axis of the locking member and a stop portion extending from the radiused portion to an outer edge of the locking member, the stop portion of the notch engaging the lever when it is moved from the open position to the closed position.

9. The liquid dispensing system of claim 8, wherein the stop portion of the notch and the longitudinal axis of the locking member define an obtuse angle relative to the spout opening.

10. The liquid dispensing system of claim 1, wherein the lever is pivotable between the closed and open positions.

11. The liquid dispensing system of claim 1, wherein the lever has a first end connected to the valve actuator and a second end opposite the first, wherein the second end of the lever is located farther away from the spout when the lever is in the open position than when the lever is in the closed position.

12. The liquid dispensing system of claim 1, further comprising a second valve and a second lever.

13. The liquid dispensing system of claim 12, wherein the second valve inlet is connected to a source of hot water, the second lever seating in the locking member when the locking member is in the locked position.

14. A liquid dispensing lever lock, comprising:
    a locking member having first and second ends, the first end defining a spout opening extending therethrough for receiving a liquid dispensing spout of a faucet such that the locking member is rotatable about a spout inserted through the opening;
    the second end of the locking member defining a notch therein for receiving a dispensing lever of the faucet;
    the locking member defining a locked position in which the notch captures the dispensing lever; and
    the notch being shaped such that the locking member is movable from the locked position to release the dispensing lever by rotating the locking member about the spout.

15. The liquid dispensing lever lock of claim 14, wherein the locking member defines a longitudinal axis, and wherein the spout opening is generally centered on the longitudinal axis.

16. The liquid dispensing lever lock of claim 14, wherein the notch is shaped such that movement of the lever from an open position towards a closed position causes the locking member to move to the locked position.

17. The liquid dispensing lever lock of claim 16, wherein the notch includes a radiused portion generally centered on a longitudinal axis of the locking member, the lever seating in the radiused portion when the locking member is in the locked position.

18. The liquid dispensing lever lock of claim 16, wherein the notch includes a radiused portion generally centered on a longitudinal axis of the locking member and a stop portion extending from the radiused portion to an outer edge of the locking member for engaging the lever to position the locking member in the locked position.

19. The liquid dispensing lever lock of claim 18, wherein the stop portion of the notch and the longitudinal axis of the locking member define an obtuse angle relative to the spout opening.

* * * * *